Oct. 1, 1935.   B. J. ANDERSON   2,015,833
BACKBONE FOR A VELOCIPEDE
Filed Jan. 5, 1935
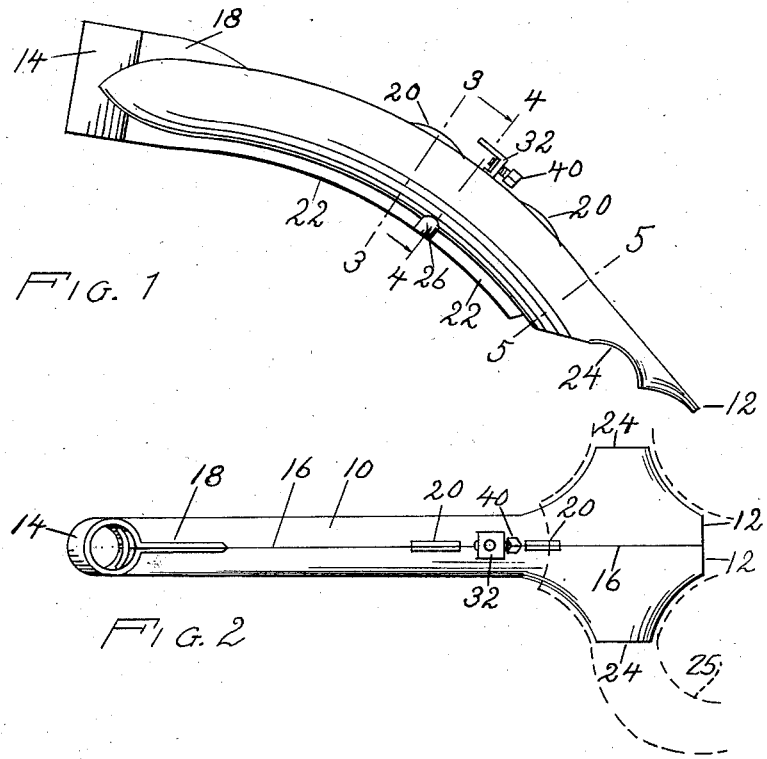
FIG. 1
FIG. 2
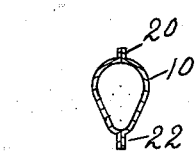
FIG. 3
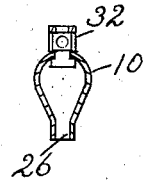
FIG. 4
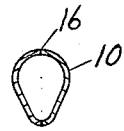
FIG. 5
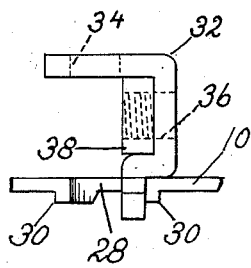
FIG. 6
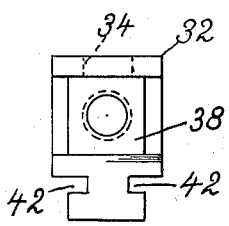
FIG. 7
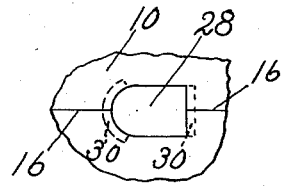
FIG. 8
BERT J. ANDERSON
INVENTOR
BY Leon T. Hooper
ATTORNEY Patented Oct. 1, 1935

2,015,833

UNITED STATES PATENT OFFICE 2,015,833

BACKBONE FOR A VELOCIPEDE

Bert J. Anderson, Hammond, Ind.

Application January 5, 1935, Serial No. 495

10 Claims. (Cl. 208—113)

This invention relates to a combination head and backbone for a velocipede. The principal object and advantage of this invention resides in the fact that a sturdy and rugged combination member may be economically formed of a single sheet metal stamping and, moreover, such member will be adaptable for use in association with various kinds of velocipede rear ends.

Another object of importance is the provision of means for joining portions of the upper edges of the stamping.

Another and still further important object of the head and backbone of this invention resides in the provision of means for joining approximately the entire lower edges of the stamping to form a downwardly projecting, easily weldable, reenforcing fin along the bottom of the backbone.

A still further important object of this invention is the removable means for securing a saddle post within the backbone.

Still another and further important object of the device is the outwardly extending portion on each end of the stamping which may be formed to fit and be secured to a rear axle supporting member.

An additional object of importance resides in the bending of the stamping to form a head and in bringing the ends of the stamping together to form a support for a rear end member.

Additional objects of importance, some of which are hereinafter set forth, will be apparent from the following specification and accompanying drawing, which illustrates the preferred construction of the device.

In the drawing:

Figure 1 is a side elevation of the combination head and backbone of this invention.

Figure 2 is a top plan view thereof with a portion of an axle supporting member shown in dotted lines.

Figure 3 is a sectional view taken on the line 3—3 of Figure 1.

Figure 4 is a sectional view taken on the line 4—4 of Figure 1, looking in the direction indicated by the arrows.

Figure 5 is a sectional view taken on the line 5—5 of Figure 1.

Figure 6 is a slightly enlarged side elevation of the saddle post securing member, with the set screw removed; and a portion of the stamping.

Figure 7 is a slightly enlarged front view of the saddle post securing member.

Figure 8 is a top plan view of a portion of the stamping and shows the receiving aperture for the saddle post securing member.

As shown in the drawing:

The reference numeral 10 indicates in a general way a stamping which is bent midway of the ends 12 to form a head 14.

Portions of the upper edges 16 of the stamping are secured in abutment by joining them together, preferably by spot welding, and other portions of the edges are associated as is indicated by the reference numerals 18 and 20. It will be noted that the securing portions 20 are preferably located beneath the saddle in order to provide a smooth top surface to the exposed portion of the backbone.

Approximately the entire lower edges of the backbone portion of the stamping 10 are turned downwardly and joined to form a reenforcing fin 22, which extends from the head rearwardly along the bottom of the backbone. A portion of each side of the stamping between the edges thereof is expanded, as is clearly shown in the drawing. In the preferred embodiment of this invention the backbone portion of the frame, as is best shown in Figures 3 and 5, is substantially oval. However, construction need not necessarily be confined to the shape here shown.

A portion of each outer edge of the stamping 20 adjacent the ends thereof extends outwardly, as is indicated by the reference numeral 24, and is shaped to be associated with the rear axle supporting member 25 which is shown in dotted lines in Figure 2. Preferably this portion of the stamping is formed to be secured within the axle supporting housing.

Formed in the fin 22 is an aperture 26, adapted to receive a saddle support.

Formed in the abutting top edges 16 of the stamping 10 is an aperture 28, the front bearing surface of which is in alignment with the front bearing surface of the aperture 26 in the lower edges. The aperture 28 has a downwardly turned front and rear edge 30, as is best shown in Figures 6 and 8. The downwardly turned edges 30 provide a relatively wide bearing surface on portions of the aperture 28.

Removably positioned in the aperture 28, is a saddle post securing member 32. A post receiving aperture as indicated by the reference numeral 34 is in alignment with the forward portion of the aperture 28 to permit a saddle post to be passed through said apertures.

Centrally located in the vertical portion of the member 32, is a set screw receiving aperture 36, as is best shown by the dotted lines in Figure 6. A nut 38, the threaded portion of which is in alignment with the aperture 36, allows the set screw 40 to contact a saddle post. When in operable position the restricted portions 42, of the member 32, engage opposed edges of the aperture 28 and prevent removal of the member therefrom while a saddle post is also in said aperture.

As is clearly shown in the drawing, the set screw 40, when tightened against the saddle post exerts a pressure against the wide bearing surfaces 30 in the front and rear portions of the aperture. The wide bearing surfaces 30, prevent scoring of the post and also lessen wear and distortion of the aperture itself.

It will be apparent from the foregoing that herein is provided an article of manufacture which is sturdy and rugged and because of its simplicity may be economically produced.

It will also be apparent that the rear end of the stamping may be varied for association with different types of axles and axle supporting members.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

1. A combination head and backbone for a velocipede, formed of a single sheet metal stamping, the central portion of said stamping being shaped to receive a steering post, each side portion of said backbone being substantially semi-oval in cross section, portions of the upper edges of said side portions being turned upwardly and joined, portions of the lower edges of said side portions being turned downwardly and joined, the ends of said stamping extending rearwardly and downwardly and a portion adjacent said ends extending outwardly and being of segmental cross section.

2. A combination head and backbone for a velocipede formed of a single sheet metal stamping, the central portion of said stamping being shaped to receive a steering post, each side portion of said backbone being substantially semi-oval in cross section, portions of the upper edges of said side portions being turned upwardly and joined, portions of the lower edges of said side portions being turned downwardly and joined, the ends of said stamping extending rearwardly and downwardly, said ends being of segmental cross section, and a portion on each side of said backbone adjacent the end thereof extending outwardly.

3. A combination head and backbone for a velocipede formed of a single sheet metal stamping, the central portion of said stamping being shaped to receive a steering post, each side portion of said backbone being substantially semi-oval in cross section, portions of the upper edges of said side portions being turned upwardly and joined, portions of the lower edges of said side portions being turned downwardly and joined, the ends of said stamping extending rearwardly and downwardly, said ends being of segmental cross section, and a portion of each side of said backbone adjacent the end thereof extending outwardly and being of segmental cross section.

4. A backbone for a velocipede formed of a single sheet metal stamping and having a convex upper surface and a concave lower surface, a portion of said stamping being shaped to receive a steering post, portions of the upper edges of said stamping being in abutment and corresponding portions of said upper edges being turned upwardly and joined together, the portions of the stamping therebetween being spaced apart to form a backbone substantially oval in cross section, and the portion adjacent each end of said stamping being of L formation and adapted to be secured to the inner surface of an axle supporting member.

5. In an apertured backbone for a velocipede, each side thereof being formed of a sheet metal stamping having a concave lower edge and a convex upper edge, a portion of said stamping being shaped to receive a steering post, the apertures being in alignment and the top aperture being adapted to receive a seat post and a seat post securing member, the ends of said stamping extending rearwardly and downwardly in parallel alignment and being shaped for connection with an axle member.

6. A substantially semi-oval stamping for a velocipede frame, the edges of said stamping being indented to form one half of a seat post receiving aperture in the mid section of said stamping, the edges of said stamping being adapted to be joined to a correspondingly shaped stamping to form a backbone substantially oval in cross section, and downwardly turned edges on the front and rear ends of said post receiving aperture.

7. A stamping for a velocipede frame, one half of a steering post bearing being formed in the head portion of said stamping, a portion of the stamping extending rearwardly from said bearing being semi-oval in cross section, said semi-oval portions being adapted to be brought together in parallel alignment with a correspondingly shaped stamping, and portions of the edges thereof being in abutment, the rear portion of said stamping being of L formation and adapted to abut, back to back, with the similar portion of a correspondingly shaped stamping.

8. A stamping for a velocipede frame, a steering post bearing formed of a portion of said stamping, the rearwardly extending portion of the stamping being adapted to be joined to a correspondingly shaped stamping, certain portions of the edges of said stamping being indented to form, when joined, a seat post securing member receiving aperture, the front and rear edges of said aperture being turned downwardly, and the side edges of said aperture being adapted to resist the removal of a seat post securing member from the aperture.

9. In a backbone for a velocipede comprising stampings semi-oval in cross section and having convex upper edges and concave lower edges, a portion of said upper edges being indented to form a seat post receiving aperture, the front and rear edges of said aperture being turned downwardly, a seat post securing member removably positioned in said aperture, portions of said seat post securing member above and below said aperture extending outwardly beyond the side edges thereof, and means associated with said post securing member for exerting a pressure to force a seat post against the front downwardly turned edge of said aperture.

10. In a longitudinally curved velocipede frame having side portions thereof substantially semi-oval in cross section, and being approximately L shaped in plan formation, said side portions being joined back to back with the transverse portion of the L extending outwardly, portions of the upper edges of the mid-section of the frame being indented to form a seat post securing member receiving aperture, an apertured seat post securing member positioned therein, the length of said aperture being greater than the width thereof, the front and rear edges of said aperture being turned downwardly, and means permitting said securing member to be joined with portions of the edges of said aperture.

BERT J. ANDERSON.